Patented Sept. 6, 1927.

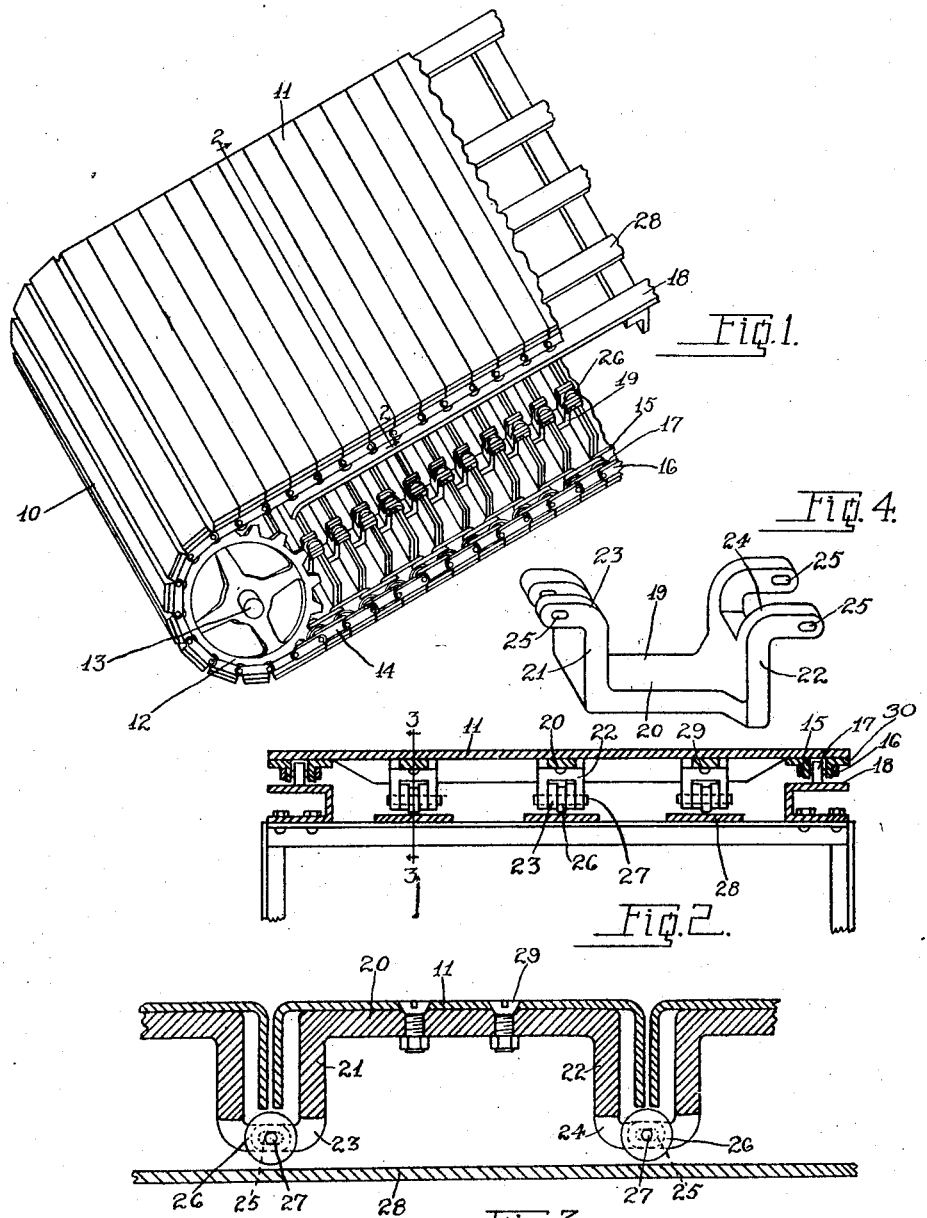

1,641,515

UNITED STATES PATENT OFFICE.

PERCY Q. WILLIAMS, OF CINCINNATI, OHIO.

LEER-PAN STRUCTURE.

Application filed May 7, 1924. Serial No. 711,710.

My invention relates to improvements in leer pan structures used in annealing leers for glass ware.

An object of my invention is to provide means for holding the leer pans on a common level when passing through the heated chambers and which will also accommodate itself to the strains and stresses incident to passage of the pans about sprockets and the like at the ends of the leer.

Another object of my invention is to provide a simple and efficient device for the purpose stated.

These and other objects are attained by the means described herein and disclosed in the accompanying drawings, in which:

Fig. 1 is a fragmental perspective view of a leer conveyor having mounted thereon devices embodying my invention.

Fig. 2 is an enlarged sectional view on line 2—2 of Fig. 1.

Fig. 3 is an enlarged sectional view on line 3—3 of Fig. 2.

Fig. 4 is a perspective view of a bracket forming a detail of my invention.

The conveyor 10 comprises a plurality of leer pans 11, adjacent pans being hingedly connected with one another whereby to provide an endless conveyor, the opposite ends of which extend about sprockets 12 carried by shafts 13. The hinged connection between adjacent pans is accomplished by means of links 14 that are connected together in such manner that there are provided two endless series of links 15 and 16 between which series of links are disposed rollers 17 that ride on tracks 18. The links serve as the means for pulling or moving the leer pans. The link or chain structures comprising the series of links 15 and 16 are the same at both ends of the leer pans and are secured to the leer pans 11 by means of brackets 30. Intermediate the ends of the leer pans are disposed brackets 19. The brackets comprise a body portion 20 having at its opposite ends angular extensions 21 and 22, the lower ends of which are offset or outwardly turned as indicated at 23 and 24. The out turned free ends of the extensions 21 and 22 are bifurcated whereby each of said out turned ends is developed into a pair of lugs. In each of the lugs there is provided an elongated aperture 25, the length of the apertures extending in a plane parallel with the plane in which extends the length of the body portion 20 of the bracket. The lugs carried by the extension 21 are adapted to receive between them a roller 26, and to be in turn received between the lugs carried by the extension 22 of an adjacent bracket. A pin or shaft 27 extends through the roller and through the lugs at adjacent ends of adjacent brackets. A track 28 disposed within the leer supports the roller 26. The pin 27 is of a diameter substantially equally to the width of the apertures 25 wherefore it will follow that the pin may move longitudinally of the conveyor but not perpendicularly thereto. From the foregoing it will be evident that when a mass of glass ware is disposed upon the conveyor, the rollers and tracks 28 support the leer pans and thereby preclude distortion of the leer pans that would otherwise occur. When the leer pans approach the sprockets and pass thereabout, the pans are free to separate for there is no binding action of the pin 27 upon the brackets. The brackets are mounted upon the leer pans in any suitable manner, for example, by means of bolts 29. The tracks 28 may be supported upon the same structures that heretofore have been employed to support the tracks 18.

The operation of my device is obvious.

What I claim is:

1. A conveyor of the class described comprising transversely extending pans, means for hingedly connecting adjacent pans for forming an endless conveyor, and supporting means connecting adjacent pans and comprising brackets having elongated apertures therein, the elongation of the apertures extending in the line of movement of the conveyor, adjacent brackets, overlapping whereby to align the apertures in adjacent brackets, axles extending through the aligned apertures, rollers carried by the brackets, and tracks for engagement by the rollers.

2. As a new article of manufacture a bracket comprising a body portion having angular extensions provided with elongated apertures, the elongations of the apertures being in the same direction as the length of the bracket, the extension being complementary whereby the extensions of one bracket may be coupled with the extension of an adjacent bracket for disposing the apertures of the different brackets in alignment.

3. As a new article of manufacture a bracket comprising a body portion, angular extensions at the opposite ends of the body portion, the extensions being bifurcated whereby to provide out turned lugs, the lugs being provided with elongated apertures, the length of the apertures extending lengthwise of the bracket, the apertures formed in the lugs of each extension being aligned, and the lugs on one extension being spaced from one another a distance substantially equal to the distance between the outside faces of the lugs carried by the other extension.

4. In a hinge structure for leer pans the combination of a pair of brackets, each bracket comprising a body portion having extensions extending in a common direction from the opposite ends of the body, the extensions being provided with bifurcated lugs having elongated apertures therein, the lugs on one extension of one bracket being spaced from one another a distance substantially equal to the distance between the outside faces of the lugs on the other bracket, and a pin, the perforations in the lugs being in alignment for receiving the pin whereby one bracket is hingedly connected with the other bracket.

5. A conveyor of the class described comprising transversely extending pans, means for hingedly connecting adjacent pans for forming an endless conveyor, a supporting means connecting adjacent pans and comprising brackets having elongated apertures at the ends thereof, the elongation of the apertures extending in the line of movement of the conveyor, adjacent brackets overlapping, axles carried by the overlapping portions of some of the brackets, and extending into the elongated apertures of adjacent overlapping bracket portions, rollers carried by the axles, and tracks for engagement by the rollers.

In testimony whereof, I have hereunto subscribed my name this 3rd day of May, 1924.

PERCY Q. WILLIAMS.